United States Patent
Elders

(10) Patent No.: US 11,920,511 B1
(45) Date of Patent: Mar. 5, 2024

(54) DIESEL TURBOCHARGER SYSTEM AND METHOD OF USE

(71) Applicant: Charles Elders, Little Elm, TX (US)

(72) Inventor: Charles Elders, Little Elm, TX (US)

( * ) Notice: Subject to any disclaimer, the term of this patent is extended or adjusted under 35 U.S.C. 154(b) by 0 days.

(21) Appl. No.: 18/086,357

(22) Filed: Dec. 21, 2022

Related U.S. Application Data

(60) Provisional application No. 63/344,804, filed on May 23, 2022.

(51) Int. Cl.
*F02B 37/04* (2006.01)
*F02B 33/40* (2006.01)
*F02B 37/14* (2006.01)

(52) U.S. Cl.
CPC ............. *F02B 37/04* (2013.01); *F02B 33/40* (2013.01); *F02B 37/14* (2013.01)

(58) Field of Classification Search
CPC .......... F02B 33/40; F02B 37/04; F02B 37/14; F01N 3/22; F01N 3/30; F01N 3/225; F01N 3/326; F01N 2550/14
See application file for complete search history.

(56) References Cited

U.S. PATENT DOCUMENTS

| | | | | |
|---|---|---|---|---|
| 4,674,283 | A * | 6/1987 | Ishida | F02B 37/20 60/276 |
| 7,654,085 | B2 * | 2/2010 | Dumas | F02B 37/10 123/585 |
| 10,427,724 | B2 * | 10/2019 | Line | B62D 63/04 |
| 10,994,737 | B2 * | 5/2021 | Ekdahl | F02B 29/00 |
| 2015/0377157 | A1 * | 12/2015 | Almkvist | F02B 37/02 60/605.1 |
| 2021/0180527 | A1 * | 6/2021 | Yang | F02D 13/04 |

* cited by examiner

Primary Examiner — Mark A Laurenzi
Assistant Examiner — Dapinder Singh
(74) Attorney, Agent, or Firm — Richard Eldredge; Leavitt and Eldredge Law Firm

(57) ABSTRACT

A turbocharger system for diesel trucks includes a compressor in gaseous communication with an engine; a turbine in gaseous communication with the engine via an exhaust manifold; the compressor intakes and compresses air to be pushed to the engine; an air compressor with one or more air tanks, the air compressor to pressurize and store air; one or more pipes connecting the air compressor to the exhaust manifold; a solenoid valve to open and close the one or more pipes between the air compressor and the exhaust manifold; and a control system to operate the solenoid valve; a command from the control system to the solenoid valve opens the solenoid valve to push air from the air compressor to the exhaust manifold to expand and speed up a turbo of the engine.

3 Claims, 4 Drawing Sheets

DIESEL TURBOCHARGER SYSTEM AND METHOD OF USE

BACKGROUND

1. Field of the Invention

The present invention relates generally to turbochargers, and more specifically, to a diesel turbocharger system for reducing lag time associated with conventional turbochargers.

2. Description of Related Art

Turbocharger systems are well known in the art and are effective means to increase power output of an engine. For example, FIG. 1 depicts a diagram of a conventional turbocharger system 101 having an engine 103 and a compressor 105. During use, the compressor 105 intakes and compresses air 107 which is then discharged to the engine 103 and passes through a charger air cooler 109. The air mixes with injected fuel to burn more efficiently to therefore increase the power output of the engine. Further, discharged air 111 exits the engine and flows to a turbine 113 to result in turbine exhaust 115.

One of the problems commonly associated with system 101 is limited efficiency. For example, there is generally a delay between the time a user initiates activation and the power created. Accordingly, it would be desirable to provide a system that reduces the delay to provide the user with faster results.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
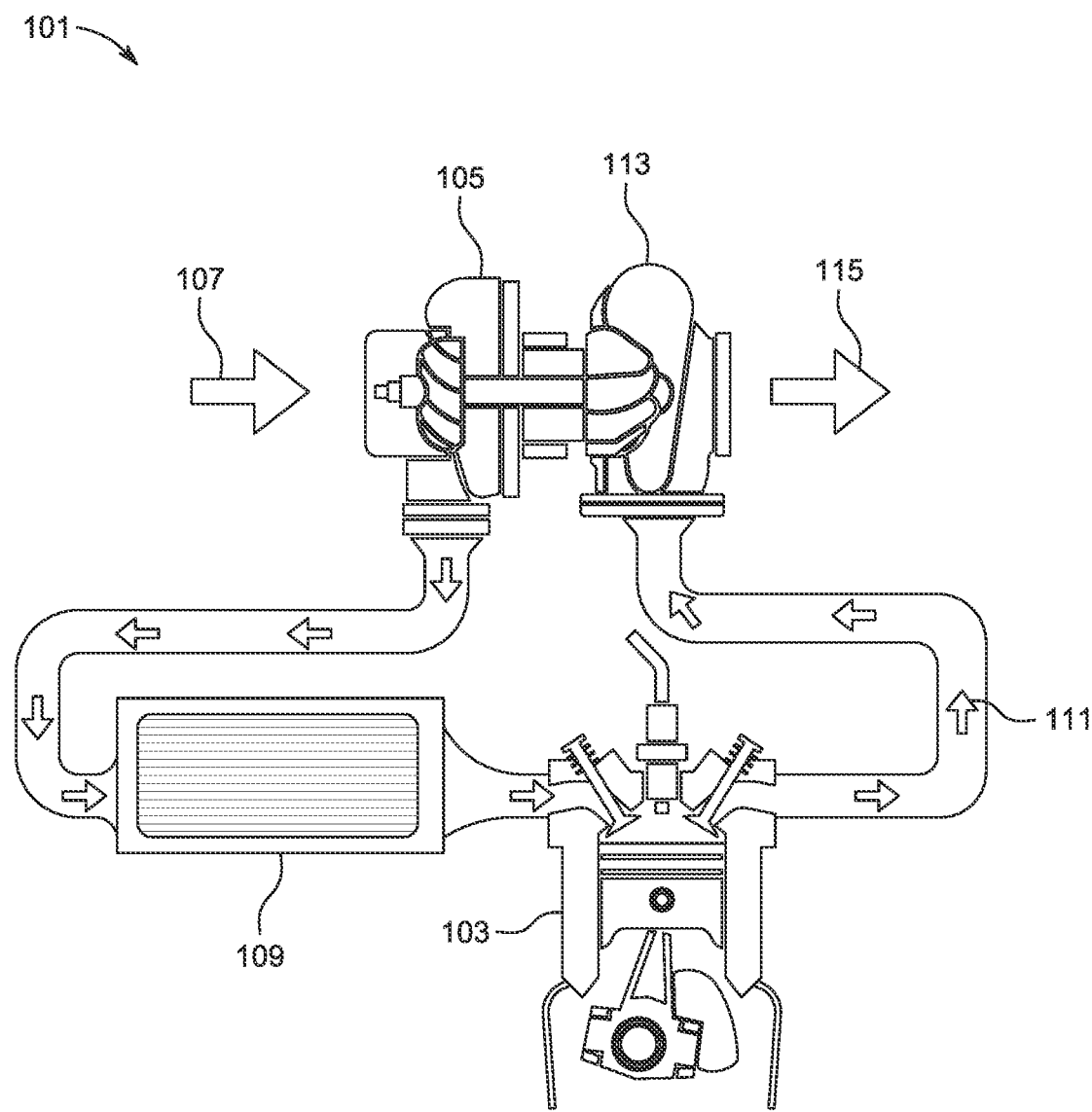
FIG. 1 is a diagram of a conventional turbocharger system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional turbocharger systems. Specifically, the present invention reduces lag time between initiation and activation of the system. In addition, the system aids in cooling turbo and exhaust gases, reducing diesel emissions on acceleration, and doubles as an on-board air system for tool, horns, and suspension air bags. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
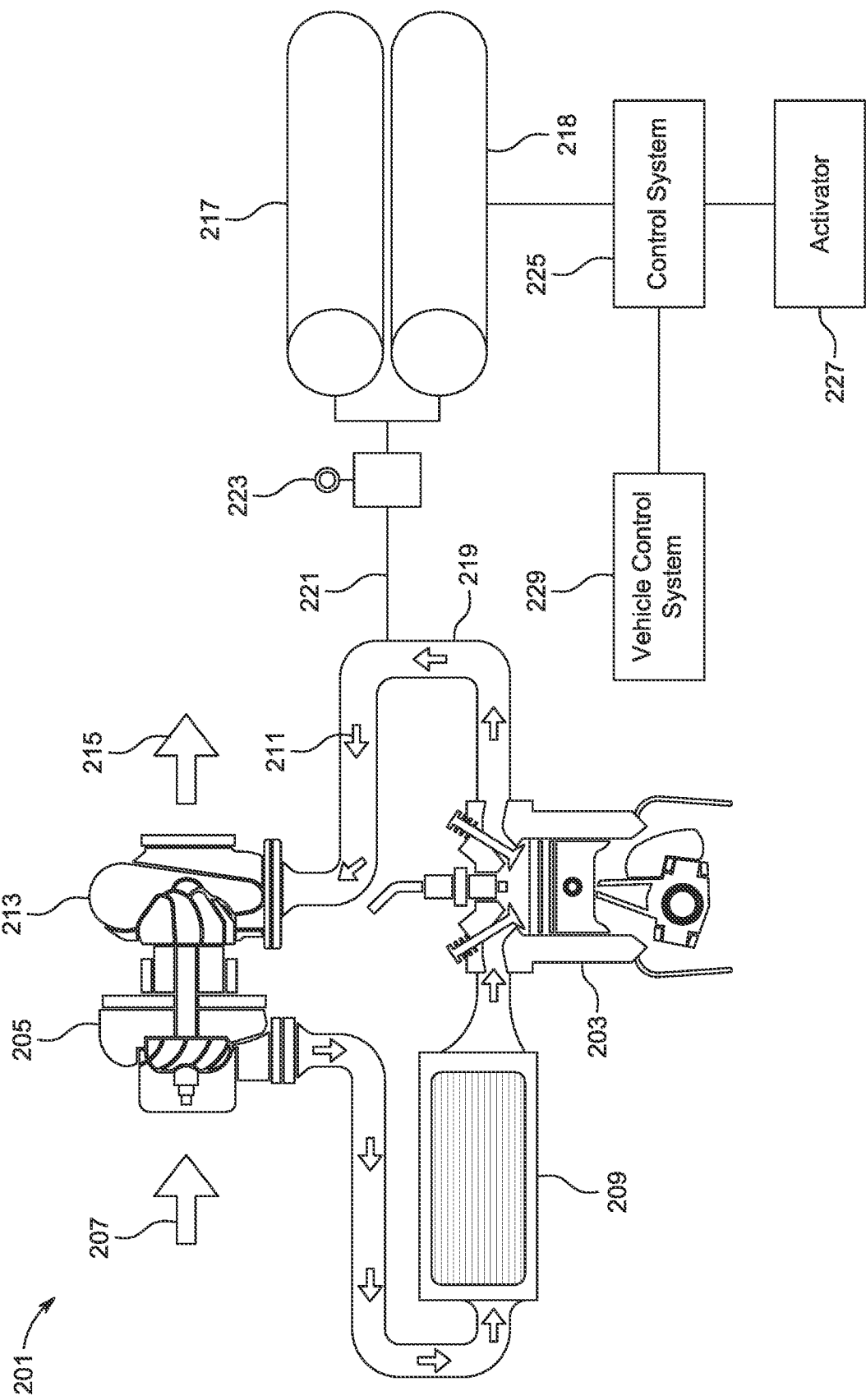
FIG. 2 is a diagram of a turbocharger system in accordance with the present invention.

Referring now to the drawings wherein like reference characters identify corresponding or similar elements throughout the several views, FIG. 2 depicts a diagram of a turbocharger system 201 in accordance with a preferred embodiment of the present application. It will be appreciated that system 201 overcomes one or more of the above-listed problems commonly associated with conventional turbocharger systems.

In the contemplated embodiment, system 201 includes the components of a conventional system, namely an engine 203 and a compressor 205. During use, the compressor 205 intakes and compresses air 207 which is then discharged to the engine 203 and passes through a charger air cooler 209. The air mixes with injected fuel to burn more efficiently to therefore increase the power output of the engine. Further, discharged air 211 exits the engine and flows to a turbine 213 to result in turbine exhaust 215.

System 201 further includes one or more air compressor tanks 217, 218 which is in gaseous communication with manifold 219 via one or more pipes 221. Further incorporated into the one or more pipes 221 is a regulator and solenoid valve 223.

The system is operated via a control system 225 and an activator 227. The activator can vary, such as being a button or switch located within a cab of the truck. Upon activation of the activator, the user has the on-demand ability to inject air into the turbocharger system. This reduces the lag time. Further, the system may be connected to a vehicle control system 229 such that activation is automatic upon acceleration.

It should be appreciated that one of the unique features believed characteristic of the present application is the use of one or more additional air compressor tanks which provides for storage of compressed air for the purpose of injecting large volumes of air into the turbocharger. This provides for multiple advantages, including 1) decrease in turbo lag leading to building powder faster and on-demand; 2) cooling of turbo and exhaust gases; 3) reducing diesel emissions on acceleration; and 4) doubles as an on-board air system for tools, horns, and suspension air bags.

Figure 3:
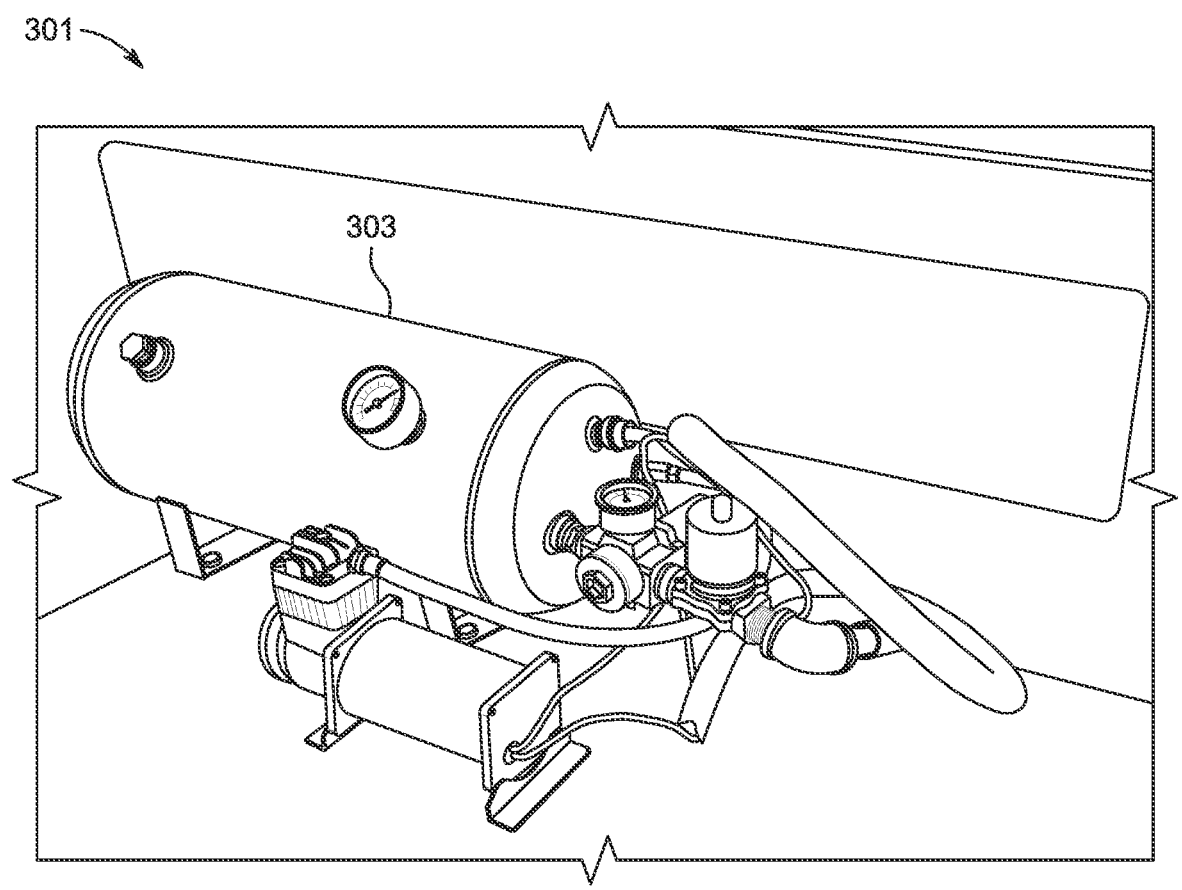
FIG. 3 is a top isometric view of an installed air compressor in accordance with the present invention.

In FIG. 3, a front isometric view depicts an air compressor 301 with a tank 303 for holding compressed air for use in system 201. As shown, the tank 303 is mounted within a bed of a truck, however it should be appreciated that alternative configurations may be utilized.

Figure 4:
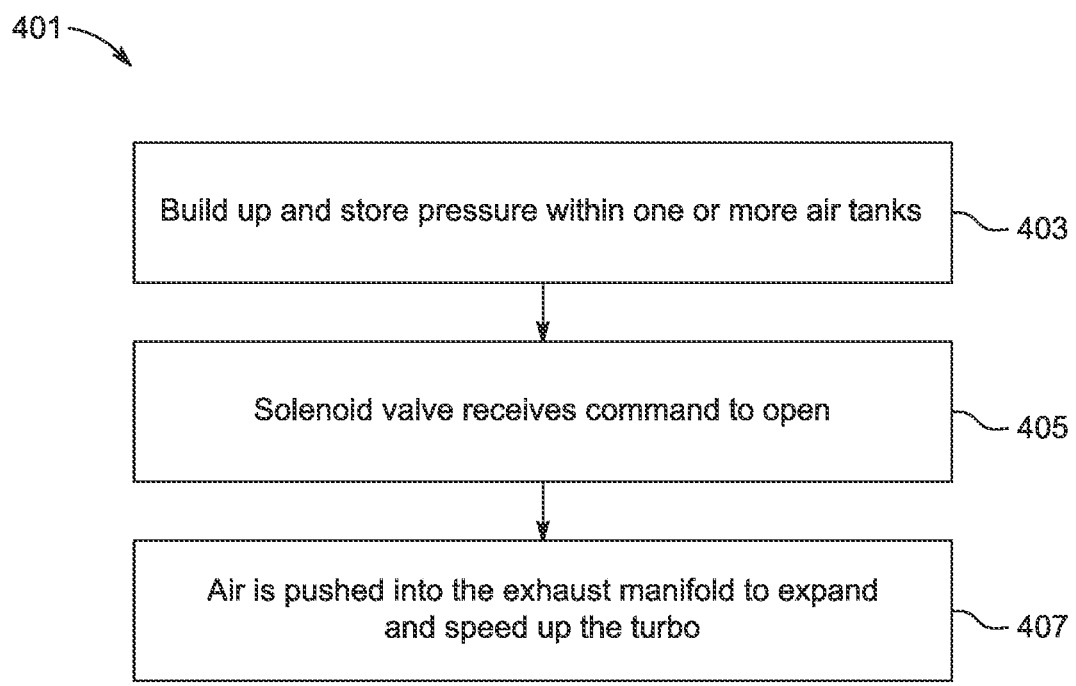
FIG. 4 is a flowchart of a method of use of the system of FIG. 2.

In FIG. 4, a flowchart 401 depicts the method of use of system 201. During use, the air compressor builds up and stores pressure within the one or more air tanks, as shown with box 403. The control system will send a command to the solenoid valve, either automatically based on acceleration as determined from the control system of the vehicle, or through activation of the activator by the user, as shown with box 405. The command opens the solenoid valve to dump air into the exhaust manifold and the cooler air expands to speed up the turbo, as shown with box 407.

It should further be appreciated that since the on-board one or more tanks would always be charged, they can be used for pneumatic tools, air bagged suspension, air horns, or a variety of other uses that are common on large diesel trucks.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A turbocharger system for diesel trucks, the system comprising:
   a compressor in gaseous communication with an engine;
   a turbine in gaseous communication with the engine via an exhaust manifold;
   wherein the compressor intakes and compresses air to be pushed to the engine;
   an air compressor with one or more air tanks, the air compressor configured to pressurize and store air within the one or more tanks;
   one or more pipes connecting the air compressor to the exhaust manifold;
   a solenoid valve configured to open and close the one or more pipes between the air compressor and the exhaust manifold;
   a control system to operate the solenoid valve; and
   a switch in communication with the control system, the switch is configured to manually activate the opening and closing of the solenoid valve;
   wherein a command from the control system to the solenoid valve via the switch opens the solenoid valve to push air from the air compressor to the exhaust manifold to expand and speed up a turbo of the engine.

2. The system of claim 1, further comprising:
   the air compressor mounted within a bed of a truck.

3. The system of claim 1, wherein the activator is a button.

* * * * *